R. E. CAMPBELL.
BLOW TORCH.
APPLICATION FILED MAY 16, 1917.
1,289,042.
Patented Dec. 24, 1918.
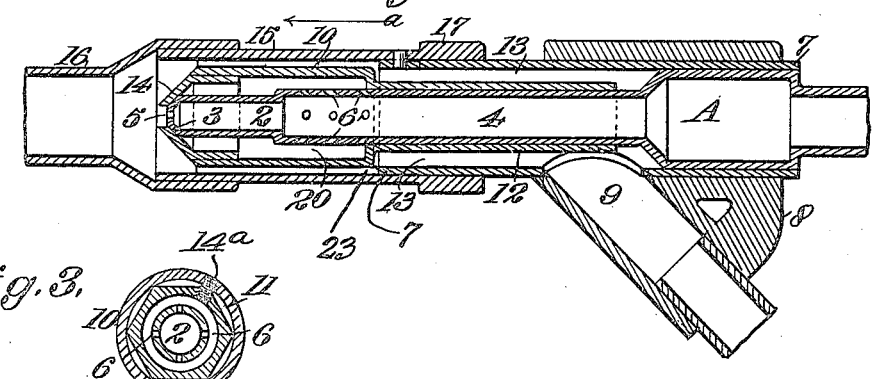
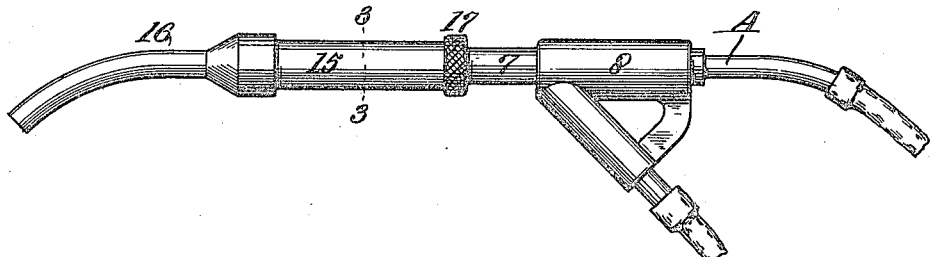
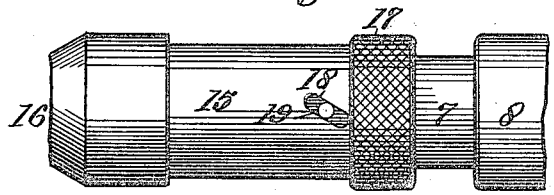
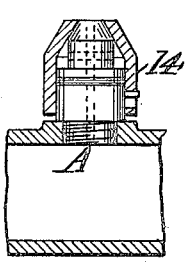
WITNESSES:
Charles Rickles
Julius E. Benesch
INVENTOR
Robert E. Campbell
BY Strong & Townsend
ATTORNEYS

UNITED STATES PATENT OFFICE.

ROBERT E. CAMPBELL, OF BERKELEY, CALIFORNIA.

BLOW-TORCH.

1,289,042.

Specification of Letters Patent.

Patented Dec. 24, 1918.

Application filed May 16, 1917. Serial No. 168,976.

*To all whom it may concern:*

Be it known that I, ROBERT E. CAMPBELL, a citizen of the United States, residing at Berkeley, in the county of Alameda and State of California, have invented new and useful Improvements in Blow-Torches, of which the following is a specification.

This invention relates to a blow torch or what is termed a blow pipe burner.

One of the objects of the present invention is to provide a simple, cheaply manufactured, easily regulated blow pipe burner, and particularly a novel form of mixing device consisting of a combination double nozzle and valve, whereby a perfect regulation and better mixture of the air and gas is obtained. Further objects will hereinafter appear.

The invention consists of the parts and the construction and combination of parts as hereinafter more fully described and claimed, having reference to the accompanying drawings, in which—

Figure 1 is a side elevation of the blow pipe.

Fig. 2 is a central, longitudinal section through the same.

Fig. 3 is a cross section on line 3—3 of Fig. 1.

Fig. 4 is a detail plan view of Fig. 2.

Fig. 5 is a detail view showing another application of the gas regulating valve.

Referring to the drawings in detail, A indicates a centrally positioned tube, the outer end of which is slightly reduced in diameter, as at 2, and beveled, as at 3, to form a valve seat. The tube is provided with a central passage 4, which is connected with a source of gas supply by a rubber hose or like device, and the tube is also provided with a pin-hole discharging opening 5, formed in the pointed end of the tube and a plurality of radially disposed discharge openings 6 formed rearwardly thereof.

The tube A, together with the exterior tube 7, is secured in a bracket member 8 of suitable shape which serves as a handle, and the tube 7 is provided with an air intake opening 9 which is connected with a source of air supply under pressure by means of a rubber hose similar to that employed for the gas. Slidably mounted on the enlarged portion of the central gas supplying tube A is a cylindrical valve 10. The exterior face of the enlarged portion of the valve shown in Fig. 2 is hexagonal or octagonal in shape, as shown at 11 in Fig. 3, to permit the escape of air, as will hereinafter be described; and the reduced portion 12 of the valve is so small in diameter that an air passage 13 is formed between the outer tube 7 and the valve.

Suitably secured in the outer end of the valve section 10 is a tubular nozzle 14, which is adapted to seat on the beveled end of the gas supplying tube A, and secured exteriorly of the valve, in any suitable manner, is a tube 15 which carries a nozzle 16. Formed on the inner end of the tube 15 is a knurled head 17 and cut through the tube 15 is an angularly disposed slot 18, through which projects a pin 19 which is secured in the tube 7. The enlarged portion of the valve 10 forms an annular chamber 20, exteriorly of the central gas supplying tube to which gas is admitted through the radially disposed openings 6, and the reduced portion 12 of the valve 10, as previously stated, forms an annular chamber 13 to which air is admitted through the opening 9. Separate air and gas chambers are thus formed within the blow pipe and the means for regulating the flow from said chambers forms one of the important features of the present invention.

This is accomplished as follows: With the gas and air turned on, it can readily be seen that a constant discharge of gas is permitted through the central pin-hole opening 5 which may be ignited from the end of the nozzle or burner tip 16. This flame will be yellow in color unless air is admitted from the chamber 13 and in reality serves the function of a pilot light. Turning of the tube 15, by means of the knurled head 17, causes the tube 15, together with the valve 10 and nozzle 14, which is secured thereto by a screw 14ª, to advance upon the inner gas supplying tube A in the direction of arrow *a*. This immediately causes the nozzle 14 to move away from its seat 3, thereby permitting a secondary discharge of gas from the chamber 20 and it also causes the shoulder 23, formed by the enlarged portion of the valve, to move away from the outer end of tube 7, thereby permitting air from the chamber 13 to discharge through the openings 11 formed between the enlarged portion of the valve 10 and the tube 15. This air discharges annularly around the nozzle 14 and while it forms a partial mixture with the gas discharging from the chamber 20 and the pin-hole opening 5, it still maintains an outer layer of air between the gas and the burner tip 16. The gas in burning will, therefore, have to pass through the outer air layer and in so doing practically perfect combustion is permitted as a perfect combination of the gas with the oxygen of the air takes place.

The angularly disposed slot 18 engaging with the pin 19 controls the forward movement of the valve 10 and the tube 15 when the knurled head 17 is turned and the amount of turning movement imparted naturally regulates the movement of the shoulder 23 with relation to the end of tube 7 and the movement of the nozzle 14 with relation to the valve seat 3. The amount of gas and air liberated can in this manner be controlled to perfection.

While the valve 10, carrying the nozzle 14, is here shown as having two functions, that of regulating the secondary supply of gas and the primary supply of air, I wish it understood that it may be employed for regulating the discharge of gas alone. For instance, referring to Fig. 5, it can be seen that the valve proper may be entirely eliminated by placing the nozzle 14 exteriorly of the tube A, which, in this instance, is constructed as a tip. The central opening in the tip permits a continuous discharge of gas while sliding movement imparted to the nozzle 14 upon the tip permits regulation of the secondary discharge of gas. The form of the valve shown in Fig. 5 may be used wherever the discharge of gas is controlled by a valve and may have many other applications besides that shown in the blow pipe.

Another important result obtained by the present form of blow pipe is the elimination of heat, as the air admitted always forms a cooling layer between the burner tip and the centrally discharged gas. In actual practice it has been found that it is possible to hold the blow pipe at any convenient point as practically no heat is conducted back. It has also been found that practically any shape of burner tip may be employed, that is the outer end may be flattened or curved to produce a flame of any shape desired.

The materials and finish of the several parts of the device are such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A blow torch comprising a stationary tube section, a gas supplying tube extending through and secured in said tube, a second tube slidably mounted on the stationary tube, a valve secured interiorly of the sliding tube and slidably mounted on the gas supplying tube, said valve having a shoulder formed thereon engageable with the end of the stationary tube and an annular chamber formed in the interior which communicates with a plurality of radially disposed gas discharging passages formed in the gas supplying tube, said valve also having an outer annular air discharging passage which communicates with an air chamber formed between the stationary tube and the gas supplying tube, means for admitting air under pressure to said chamber, a nozzle secured in the valve engageable with a seat formed on the outer end of the gas supplying tube, and means for moving the sliding tube, the valve and the nozzle carried thereby longitudinally upon the stationary tube and the gas supplying tube.

2. A blow torch comprising a stationary tube section, a gas supplying tube extending through and secured in said tube and spaced therefrom, a valve slidably mounted on the gas supplying tube, said valve adapted to engage a seat formed on the end of the gas supplying tube and said valve also having a shoulder formed thereon adapted to engage the end of the stationary tube, a chamber formed in the valve which communicates with a plurality of gas discharging passages formed in the gas supplying tube, a tube slidably mounted on the stationary tube, means for securing said tube to the valve, means for moving said tube and valve in unison longitudinally on the stationary tube and on the gas supplying tube, and means for connecting the stationary tube with a source of air supply under pressure.

3. A blow torch comprising a stationary tube section, a gas supplying tube extending through and secured in said tube and spaced therefrom, a valve slidably mounted on the gas supplying tube, said valve adapted to engage a seat formed on the end of the gas supplying tube and said valve also having a shoulder formed thereon adapted to engage the end of the stationary tube, a chamber formed in the valve which communicates with a plurality of gas discharging passages formed in the gas supplying tube, a tube slidably mounted on the stationary tube, means for securing said tube to the valve, means for moving said tube and valve in unison longitudinally on the stationary tube and on the gas supplying tube, means for connecting the stationary tube with a source of air supply under pressure, and a plurality of longitudinally disposed passages formed in the valve between the sliding tube and the valve to permit air to discharge between the sliding tube and the valve when the shoulder of the valve is moved away from the stationary tube.

4. A blow torch comprising a stationary tube section, a gas supplying tube extending through and secured in said tube and spaced therefrom, a valve slidably mounted on the gas supplying tube, said valve adapted to engage a seat formed on the end of the gas supplying tube and said valve also having a shoulder formed thereon adapted to engage the end of the stationary tube, a chamber formed in the valve which communicates with a plurality of gas discharging passages formed in the gas supplying tube, a tube slidably mounted on the stationary tube, means for securing said tube to the valve, means for moving said tube and valve in unison longitudinally on the stationary tube and on the gas supplying tube, said means comprising an angularly disposed slot formed in the sliding tube, a pin secured in the stationary tube projecting into said slot, a collar on the sliding tube by which it is adapted to be turned to move the sliding tube and the valve longitudinally, and means for connecting the stationary tube with a source of air supply under pressure.

5. A blow torch comprising a stationary tube section, a gas supplying tube extending through and secured in said tube and spaced therefrom, a valve slidably mounted on the gas supplying tube, said valve adapted to engage a seat formed on the end of the gas supplying tube and said valve also having a shoulder formed thereon adapted to engage the end of the stationary tube, a chamber formed in the valve which communicates with a plurality of gas discharging passages formed in the gas supplying tube, a tube slidably mounted on the stationary tube, means for securing said tube to the valve, means for moving said tube and valve in unison longitudinally on the stationary tube and on the gas supplying tube, said means comprising an angularly disposed slot formed in the sliding tube, a pin secured in the stationary tube projecting into said slot, a collar on the sliding tube by which it is adapted to be turned to move the sliding tube and the valve longitudinally, means for connecting the stationary tube with a source of air supply under pressure, and a plurality of longitudinally disposed passages formed in the valve between the sliding tube and the valve to permit air to discharge between the sliding tube and the valve when the shoulder on the valve is moved away from the stationary tube.

In testimony whereof I have hereunto set my hand.

ROBERT E. CAMPBELL.